United States Patent [19]

Ehrich et al.

[11] 3,816,645

[45] June 11, 1974

[54] COMMUNICATIONS SYSTEM

[75] Inventors: William G. E. Ehrich, Conches, Switzerland; Jackson D. Bigham, Jr., Lakeville, Minn.

[73] Assignee: Control Data Corporation, Minneapolis, Minn.

[22] Filed: Jan. 3, 1973

[21] Appl. No.: 320,772

[52] U.S. Cl. .................................................. 178/2 R

[51] Int. Cl. .......................... H04l 15/00, H04q 1/00

[58] Field of Search ........ 178/DIG. 3, 2 R, 3, 4.1 R, 178/6.8, 6; 179/2 DP, 15.55 R, 15 BW

[56] References Cited

UNITED STATES PATENTS

| | | | |
|---|---|---|---|
| 2,909,601 | 10/1959 | Fleckenstein et al. | 178/6.8 |
| 2,978,535 | 4/1961 | Brown | 178/6 |
| 3,061,672 | 10/1962 | Wyle | 178/DIG. 3 |
| 3,347,981 | 10/1967 | Kagan et al. | 178/DIG. 3 |
| 3,374,309 | 3/1968 | Elich et al. | 178/2 R |
| 3,478,318 | 11/1969 | Rorholt | 178/2 R |
| 3,483,317 | 12/1969 | De Groat | 178/DIG. 3 |
| 3,560,639 | 2/1971 | Centanni | 178/DIG. 3 |
| 3,714,377 | 1/1973 | Moretti | 178/DIG. 3 |
| 3,723,641 | 3/1973 | Heinrich et al. | 178/DIG. 3 |

*Primary Examiner*—Thomas A. Robinson
*Attorney, Agent, or Firm*—Robert M. Angus; Joseph A. Genovese

[57] ABSTRACT

A processor substation for a communication system includes interrupt circuitry for transmitting coded communications as logic levels, rather than fixed length bits, so that communications can be handled at various code speeds and bit lengths. A message to be received by a subscriber is processed by an interrupt means in the substation to change the signal level to the subscriber whenever a transition occurs in the message (e.g. 1 to 0, and vice versa).

19 Claims, 6 Drawing Figures

PATENTED JUN 11 1974 3,816,645

SHEET 1 OF 3

COMMUNICATIONS SYSTEM

SPECIFICATION

This invention relates to code communications, and particularly to code communications systems, such as telegraphy, wherein substation controllers control transmission of code communications between subscribers of the same, or different, substations.

Telegraphy systems include subscriber stations capable of transmitting and receiving intelligible code communications. The codes generated and/or received by any particular subscriber station ordinarily include a plurality of bits which together represent a character of a message. Ordinarily, start and stop bits embrace the bits of the character text, and the number of bits for any particular character is usually the same. The subscribing stations generate codes peculiar to characters of a message and transmit these codes through a controlling substation for transmission to other substations, sometimes through a controlling central station. The pulse widths of the bits of the code generated by any particular substation are ordinarily quite long, on a time scale, compared to the data processing capabilities of any of the substations. Consequently, the data handling capabilities of any controlling substation are not fully utilized by virtue of the fact that a substantial portion of the time of the substation operation is utilized in transmitting a pulse substantially longer than the time necessary to control that pulse.

It is an object of the present invention to provide a substation for a code communications system which controls the transmission of code communications between subscriber stations at a significantly faster rate than prior substations.

It is another object of the present invention to provide a substation controller for handling code communications which is responsive to a change in bit value (e.g., from a 0 to a 1, and vice versa) and which provides an interrupt signal in response to such change to transmit a code.

It is another object of the present invention to provide a substation controller capable of simultaneously handling a plurality of messages between subscriber stations.

It is yet another object of the present invention to provide a substation controller capable of handling codes at varying code speeds.

In accordance with the present invention, a substation controller includes an interrupt clock capable of controlling the shift of a binary value of a signal on a line at predetermined times established by a code controlled by a subscriber station. A code, to be received by a subscriber station, is stored in a memory within the substation and a processor flags the interrupt clock at predetermined times in accordance with a "transition" or change of the binary value of the bits of the code. When the interrupt cycle reaches a flag time, the interrupt clock controls operation of the processor to correspondingly change the binary value appearing on a line to the particular subscribing station.

As used herein, the term "transition" as used in connection with a change of code, means a change of code level between binary 1 and binary 0, and vice versa. However, no "transition" occurs between successive binary 1's or successive binary 0's. The term "transmit," as used herein, means the sending of coded information from one subscriber station to another; and the term "receive," as used herein means the reception of coded information by one subscriber station from another.

One feature of the present invention resides in the fact that if a code contains successive bits having the same binary value, the interrupt is not flagged and the processor is not operated, thereby freeing the processor to operate on messages from different subscribers. Similarly, a plurality of messages from different subscribers may be handled simultaneously by the processor without affecting code transmission of any of the subscribing stations.

Another feature of the present invention resides in the fact that the processor is capable of handling codes at varying code speeds merely by effectuating operation of the interrupt clock in accordance with the code speed of a particular subscribing substation.

The above and other features of the invention will be more fully understood from the following detailed description and the accompanying drawings, in which.

SYSTEM OPERATION

Figure 1:
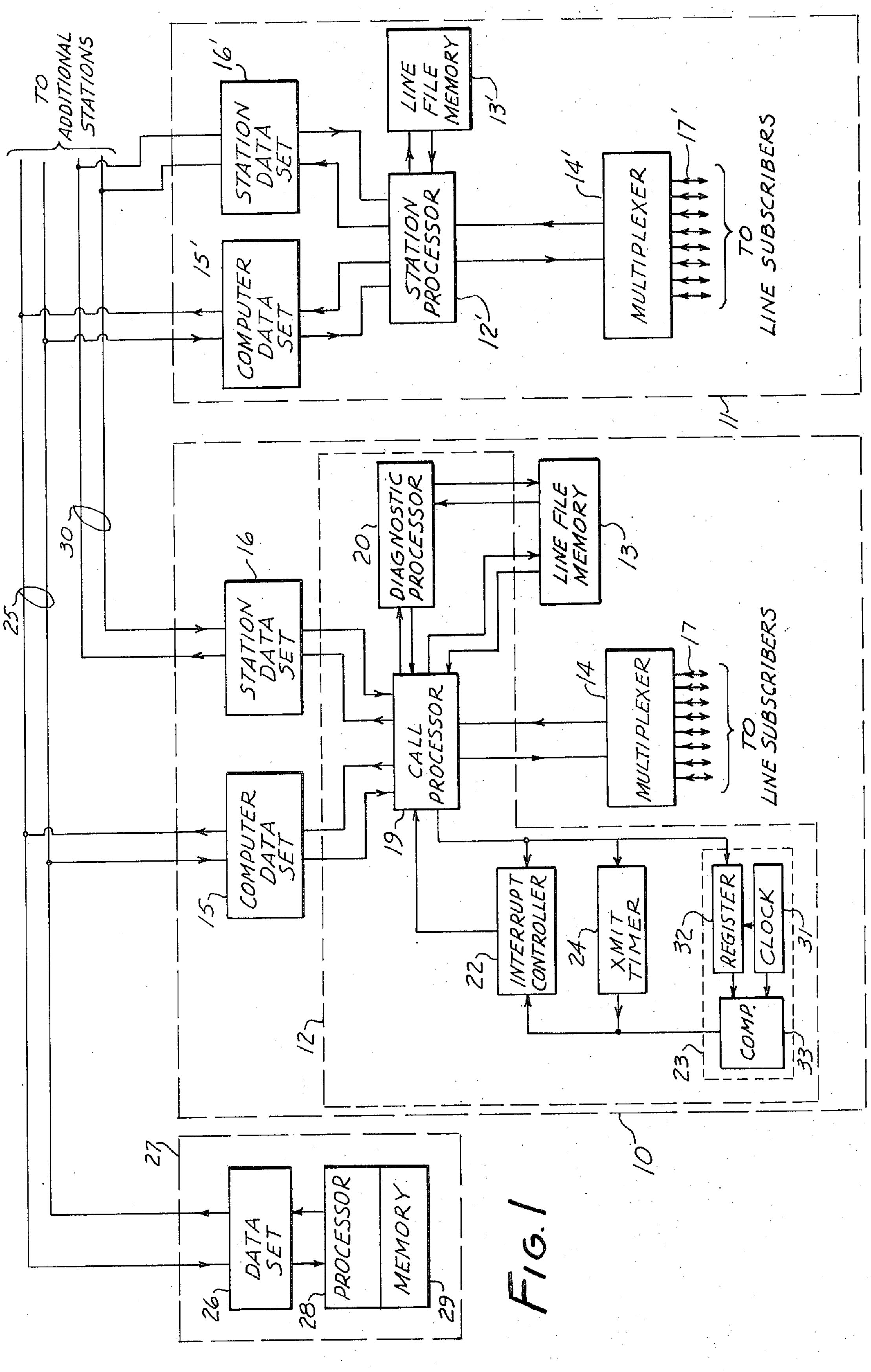
FIG. 1 is a block circuit diagram of a communications system in accordance with the presently preferred embodiment of the present invention.

Referring to the drawings, and particularly to FIG. 1, there is illustrated a communications system, such as a telegraph system, comprising a plurality of substations 10, 11, etc. each having a station processor 12, 12', etc., a line file memory 13, 13', etc., a multiplexer 14, 14', etc., a computer data set 15, 15', etc., and a station data set 16, 16', etc. Each multiplexer 14, 14', etc. is connected via suitable channels 17, 17' to individual line subscribers, such as individual telegraph stations. Each substation processor includes a call processor 19, connected to a diagnostic processor 20, interrupt controller 22, receive timer 23 and transmit timer 24. The data sets 15 of each substation are connected via suitable communications channel 25 to the data set 26 of a central controlling computer 27. Computer 27 includes also a processor 28 and a memory 29. In addition, data sets 16 of each substation are connected together via communications channel 30.

In operation of the system, a subscriber desiring to make a call generates a suitable code, to be hereinafter described, which is indicative of the subscriber to be called. The code is received by call processor 19 and stored in a predetermined location in line file memory 13, the location of storage of the called subscriber code being indicative of the calling subscriber. Call processor 19 initially operates through data set 15 to central computer 27 wherein the location of the called subscriber is determined, and a code is returned through the data set 15 to call processor 19 indicative of the route by which a communications channel will be established. This information is placed in memory 13, and call processor 19 thereafter establishes communication through data set 16 to channel 30. (As will be more fully understood hereinafter, computer 27 may also transmit information concerning transmission speed and bit length characteristics of the called subscriber, as well as control signals for busy lines and other functions of the system.)

A call message, indicative of the address of the calling subscriber and containing the address of the called subscriber as determined by computer 27, is sent through data set 16 to channel 30 which in turn is received through data set 16' of the remote substation 11. The call processor 19' within remote station 11 processes the call message to the line file memory 13' of the remote station. Thus, the line file memory of the called substation contains the address of the calling subscriber at a location unique to the called subscriber. Thereafter, all communications will be controlled by the station processors of the individual substations, thereby eliminating the central computer from further processing of controls.

The called substation may acknowledge the call through its individual station processor by transmitting back through the station data set to the call processor of the calling substation an acknowledgement signal indicative of clearance to proceed with a message. The calling subscriber thereafter sends its message via the station data set 16, each message being preceded by the address code, as stored in memory 13, indicative of the called subscriber. Likewise, replies by the called subscriber are routed through the station data sets as determined by the address code stored in the line file memory 13' of the called substation. If desired, the central computer 27 may seize control of both the called and calling substations until complete establishment of the communications channel between individual subscribers.

CHARACTER RECEPTION

Assume, for example, that a message character is received by a substation for processing therein to a particular subscriber linked to that substation. The coded character, together with a coded address indicative of the particular subscriber station, is received through station data set 16 by the station processor 19. Processor 19 examines the address code of the message and compares it against all address code associated with the subscriber stations linked to the substation. If the received address code compares to one of the subscriber stations, processor 19 accepts the coded character and stores the entire character in line file memory 13 at a location determined by the address code, and thus indicative of the subscriber station which will ultimately receive the character. After the character is fully assembled and stored in the appropriate location in line file memory 13, processor 19 examines the binary value of the first bit of the code and sends a coded signal indicative of the address of the stored character in line file memory 13 together with a "mark" or "space" bit representative of the binary level of the first bit of the stored character. The address may conveniently consist of nine binary bits which is forwarded to multiplexer 14 to control the multiplexer in the manner to be described in greater detail hereinafter. The multiplexer is operated by the address code to establish communication to the selected line subscriber station so that the subscriber receives either a binary 1 or 0, as the case may be.

Simultaneously with the sending of the first coded signal to the subscriber, processor 19 examines the line file memory for the first transition (e.g. 1 to 0 or 0 to 1) in the stored coded character and sets an interrupt signal (or "flag") in a predetermined location in receive timer 23. Conveniently, timer 23 includes a free running clock register 31 containing real time data, a flag or interrupt signal register 32, and a comparator 33. The interrupt signal is stored in the interrupt signal register at a location therein determined by the location of the character code in memory 13 (and, consequently, the address of the particular subscriber). The interrupt signal is a coded signal indicative of the time at which the interrupt will occur, and hence, is time-related to the length of the bits having same binary level. Thus, timer 23 will contain a coded message indicative of the time of the first transition in the coded character at a location in the register indicative of the subscriber which will receive the character.

At each advance of the clock, timer 23 examines its register and operates its comparator to determine if any interrupt signal stored therein corresponds to the value in the real time clock. Thus, and referring to FIG. 3, if the leading edge of the first bit of the character occurred at time $t_0$ and the first transition occurs at time $t_{10}$, the interrupt signal register of time 23 is conditioned to store a signal representative of $t_{10}$ at a location representative of the location of the character in line file memory 13. As the real time clock in timer 23 steps to successive times, the timer examines the register to determine if any signal contained therein corresponds to the time clocked by timer 23. When such a correspondence occurs, timer 23 conditions interrupt controller 23 to interrupt normal activities of processor 19 and its internal register (not shown) and to cause processor 19 to examine the corresponding location in line file memory 13 to send a coded signal to the subscriber, the coded signal containing the address of the subscriber together with a "mark" or "space" bit representing the new binary value for the next bit(s). At the same time, processor 19 examines the line file memory for the next transition (in this case at $t_{30}$) and inserts new information representative of the time of such transiton in the interrupt signal register in timer 23 at the location unique to the subscriber, as heretofore described.

Figure 3:
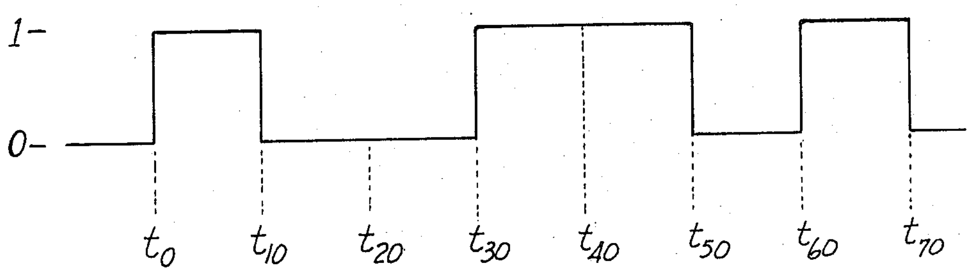
FIGS. 3 – 6 are representations of character and control codes for explaining the operation of the system illustrated in FIG. 1.

In operation of the device as thus far described, assume that the character shown in FIG. 3 is intended for transmission to subscriber number 64 linked to the substation. An address code associated with the incoming character directs the character to a location in line file memory 13 associated with subscriber 64. Thus, further addressing within the substation is hardwired so that primary processing is accomplished by transmission of data, rather than addresses. When the character is completely assembled in memory 13, as might be determined from a stop bit associated with the character, processor 19 sends an address code indicative of the address of subscriber 64 together with a binary bit indicative of the value of the first bit of the character. This coded signal is sent to multiplexer 14 for eventual operation on the subscriber station, as will be more fully understood hereinfter. Also, processor 19 stores a signal in timer 23 indicative of the expected time of the first transition of the binary level of the character code. Since the location of the storage of the signal in timer 23 is dependent upon the location in memory 13 of the character code, the connection may be hardwired through processor 19, with the processor merely adding the code indicative of the interrupt time, as determined from the location of the transition, to the time appearing on the real time clock in timer 23.

Figure 4:
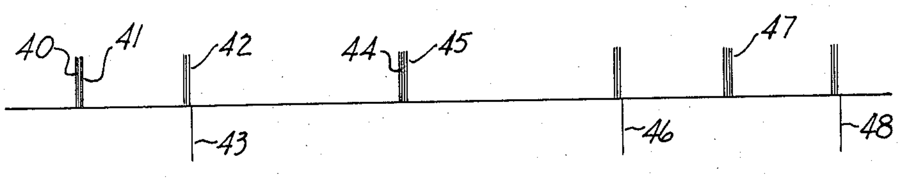

With reference to FIG. 4, the first coded signal sent by substation 10 to subscribr number 64 is shown having an address 40 followed by a bit 41 indicative of a binary 1 in the character. As will be more fully understood hereinafter, bit 41 will control multiplexer 14 to change the level of input signals to subscriber 64 to a "1" binary level. At the same time, processor 19 controls timer 23 to store a signal indicative of the next transition of the coded character (in this case from a 1 to a 0). Since it has been assumed that the first character commenced at time $t_0$ and that each bit of the character is ten time units in length, and it is assumed that the character consists of 1001101, it is evident that the first transition occurs following the first bit and that such transition will occur at time $t_{10}$ at the transition between the first and second bits of the character. (It is assumed that the character code speed is significantly slower than the speed of operation of processor 19 and timer 23. Consequently, the length of time required to send the address code 40 and control bit 41 is significantly shorter than the length of a single bit of the character code. In reality, the character code speed will ordinarily be more than 10 times as slow as the processing speed, but the one to 10 ratio is used herein for purposes of illustration.)

When the real time clock in timer 23 steps to $t_{10}$, processor 19 is operated to send another address code 42 followed by a control bit 43 indicative of a binary 0 to multiplexer 14 to change the level of signals to subscriber 64 to represent a 0 level. Since the next two bits in the character code are both binary 0's, he next transition will not occur until $t_{30}$, at which time processor 19 again operates when the real time clock of timer 23 reaches $t_{30}$, at which time processor 19 is again controlled to send a coded signal consisting of address 44 and control bit 45, indicative of a binary 1, to multiplexer 14. The process continues through the character until all transitions of the character are sent. Thus, control bit 46, indicative of a 0, is sent at $t_{50}$; control bit 47, indicative of a 1, is sent at $t_{60}$; and control bit 48, indicative of a 0, is sent at $t_{70}$.

As will be more fully understood hereinafter, multiplexer 14 will alter the signal level on the line to subscriber station 64 to reconstruct the character code from control bits 41, 43, 45, 46, 47 and 48 by shifting to a 1 binary level for the time duration of one bit, to a 0 binary level for the length of two bits, to a 1 binary level for the length of two bits, to a 0 binary level for the length of one bit, and to a 1 binary level for the length of one bit. Thus, the subscriber station receives the character code 1001101.

Figure 5:
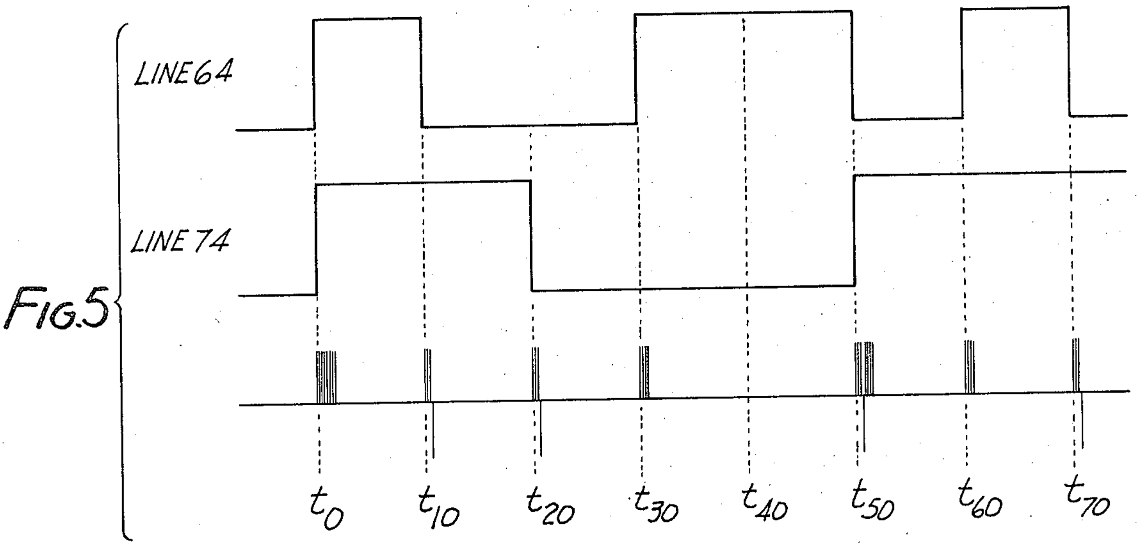

By utilizing receive timer 23 and controller 22 in an interrupt mode to interrupt call processor 19 at preselected times signifying events in a character, minimal processor time is required for handling data. It is evident that several messages can be handled simultaneously or at staggered times. Thus, as shown in FIG. 5, separate characters to subscriber numbers 64 and 74 can be handled simultaneously. Thus, if subscriber number 64 is to receive coded character 1001101 and subscriber number 74 is to receive coded character 1100011, the interrupt schedule performed by processor 19, receive timer 23 and controller 22 is as follows (assuming both characters commence at $t_0$):

| TIME | FUNCTION |
|---|---|
| $t_0$ | "mark" to lines **64** and **74** |
| $t_{10}$ | "space" to line **64** |
| $t_{20}$ | "space" to line **74** |
| $t_{30}$ | "mark" to line **64** |
| $t_{50}$ | "space" to line **64**; "mark" to line **74** |
| $t_{60}$ | "mark" to line **64** |
| $t_{70}$ | "space" to line **64** |

It is understood that at all other times, processor 19 takes no action with respect to subscribers 64 and 74 and is therefore free to process other subscriber messages.

MULTIPLEXER

Figure 2:
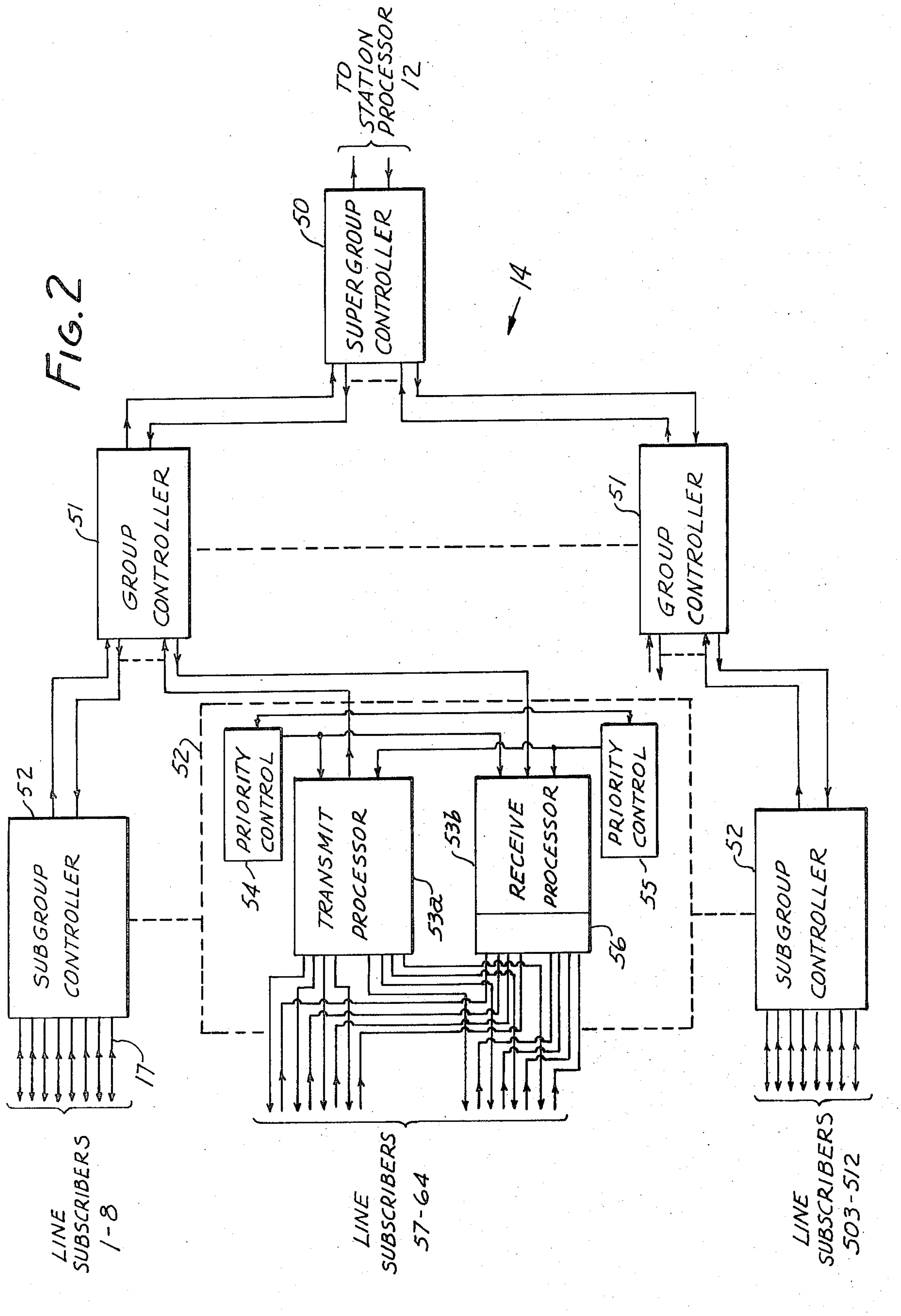
FIG. 2 is a block circuit diagram of a multiplexer for use in the communications system illustrated in FIG. 1.

One feature of the invention resides in the provision of a pyramid multiplexer, shown in FIG. 2, having a supergroup controller 50 connected to a plurality, for example eight, individual group controllers 51, each connected to a plurality, for example eight, subgroup controllers 52. Each controller, 50, 51, 52 includes a transmit processor 53*a*, a receive processor 53*b*, and priority controllers 54 and 55. The processors 53*a*, 53*b* of the lowest tiered controllers (subgroup controllers 52) are connected to a group of subscriber stations. Preferably, the receive processors 53*b* of subgroup controllers 52 also include line interface circuits 56 responsive to the transition codes from the substation 12 to alter the voltage appearing on the lines to the subscribers.

Each transmit processor 53*a* of controllers 50, 51 and 52 is responsive to a change in state of any input to immediately seize the input line and transfer the incoming signal to the next higher tiered controller. Thus, if a subscriber desires to transmit a message, the first bit of the message imposed on the transmit processor 53*a* of the respective subgroup controller 52 causes controller 52 to make connection to that line to transfer the code directly to the respective group controller 51. Likewise, the group controller responds to transfer the message to the super group controller 50 for communication to the substation processor 12. Ordinarily, the message from the subscriber will include an address code indicative of the address of the calling station. Alternatively, each controller 50, 51 and 52 may add to the transmitted signal a code indicative of the location from where the message came, thereby reconstructing the address of the subscriber.

In the event that a particular controller is in the process of transferring a message when another message is attempted on another line, priority controller 54 notes that the second line is ready to transmit and causes the processor 53a of the controller to seize that second line as soon as transmission is completed on the first line. As will be more fully understood hereinafter, actual transmission may be delayed by the multiplexer until processor 12 indicates to the subscriber that it is ready to receive the message.

The multiplexer thereby sends to processor 12 a coded signal representative of the address of the transmitting (calling) subscriber followed by a control bit representative of the binary level of the first bit of the transmitted character. Upon completion of sending the coded signal to processor 12, the processors of multiplexer 14 are freed to commence (or continue) processing other messages. Another control bit will not be forwarded through the multiplexer until a transition (e.g. 1 to 0 or 0 to 1) occurs on a subscriber line. For example, and with reference to FIG. 3, if a subscriber desires to send a coded character 1001101, upon conditioning line 17 between the subscriber and multiplexer 14 with the first bit (1), the multiplexer seizes the line and transmits a coded signal containing the address of the transmitting subscriber and a control bit representative of the 1 binary level. Thereafter, the multiplexer leaves the transmitting line for operation on other transmitted calls. At some later time when the level on line 17 is changed to a binary 0, the multiplexer again seizes the line and transmits a second coded signal representative of the address of the transmitting subscriber followed by a control bit representative of binary 0. The process continues until processor 12 receives all control bits, spaced in time, representative of the changes between binary 1 and 0 of the transmitted character.

In the reception mode, a coded message containing the address of a subscriber and a control bit indicative of the binary level of a bit is sent to the receive processor **53*b* of supergroup controller 50 as heretofore explained. For example, the message may consists of 10 bits (nine address bits and the control bit). Receive processor 53*b* of controller 50 examines the first three bits of the address to determine which group controller the message should be routed to. Controller 50 then sends the next six bits of the address (dropping the first three bits) and the control bit to the selected group controller 51 which in turn selects from the first three received bits a subgroup controller. The group controller then sends the last address bits and the control bit to the selected subgroup controller 52 which in turn selects a subscriber from the three address bits. The control bit is then applied to a control or line interface circuit 56 associated with the line to the selected subscriber to control the binary signal level appearing on the line. For example, a 1 control bit might cause circuit 56 to raise the voltage on the line to +10v., while a 0 control bit might cause circuit 56** to lower the voltage to −10v. The voltage to the subscriber remains constant until reception of the next control bit (or until disabled by an end of message code).

One feature of the present invention resides in the provision of dual complemented priority controls for each of the controllers of the multiplexer. One problem associated with time division multiplexers used for communication systems resides in the fact that if a line to the multiplexer becomes faulty so as to generate a continuous signal thereon, as may be occasioned by noise or other extraneous signal imposed upon the line, the multiplexer will seize that line so that no other lines may transmit. Thus, with an eight input multiplexer, if one of the lines should become faulted, the priority control associated with the multiplexer will seize that line, thereby locking out lower priority lines. For example, if line five of a controller of a multiplexer stage becomes faulted, the multiplexer seizes line number five, thereby omitting lines six through eight. However, through the use of a complemented priority control 55, priority controller 54 may be disabled to lockout line five after a predetermined period of time, thereby bypassing the faulted line number five, and assuring full control to the other lines.

CHARACTER TRANSMISSION

If a subscriber station is conditioned to send a message, such as by a manual input to a data console (not shown) in the subscriber station to thereby develop a message containing one or more binary coded characters, the calling subscriber initiates a "call" which preferably includes an address representative of the identity of the called subscriber. (This address may or may not be the actual address of the called subscriber, since the actual address of the called subscriber may be directed by computer 27 as heretofore described.) The "call" code is forwarded to call processor 19 in the respective substation 12 through multiplexer 14. For example, if a particular subscriber desires to send a message to another subscriber, the calling subscriber may initiate a character consisting of a plurality of 1s and 0s and forward the same to the transmit processor of the lowest tiered controller of multiplexer 14. That processor is responsive to a transition of the line voltage appearing from each subscriber, as heretofore described, to transmit a coded signal to the next superior processor, the coded signal containing the address of the particular subscriber station and a control bit indicative of the change of binary level. Conveniently, each processor of the multiplexer may add three bits to the coded signal to thereby construct the address of the calling station. Hence, a coded signal quite similar to that shown in FIG. 4 will be "constructed" by the substation and controllers 50, 51, and 52 for inputing to processor 19 of the substation 12.

With reference to FIGS. 3 and 4, if the calling subscriber is to send a character 1001101, a "mark" bit will be sent at the beginning of the first message bit (e.g. $t_0$), a "space" bit will be sent at the beginning of the second message bit (e.g., to $t_{10}$), a "mark" bit will be sent at the beginning of the fourth message bit (e.g., $t_{30}$), a "space" bit will be sent at the beginning of the sixth message bit (e.g., $t_{50}$), a "mark" bit will be sent at the beginning of the seventh message bit (e.g., $t_{60}$) and "space" bit will be sent at the end of the seventh message bit (e.g., $t_{70}$). It is understood that an address code, indicative of the calling subscriber, accompanies each mark and space bit. Upon reception of each group of coded bits, processor 19 examines the address thereof and stores the control bit in the line file memory 13 of the substation at a location dependent upon the address code and unique to the calling subscriber.

Ordinarily, each character is preceded by a start bit and ended with a stop bit. It may occur that the last bit of the first portion of the character has the same binary level as the stop bit. Accordingly, it is necessary to time each character as it is received in the substation to assure proper reconstruction of the transmitted code. Accordingly, when the code associated with the start bit of the character is received by call processor 19, processor 19 initiates operation of transmit timer 24 to time the reception of the code. Since the processor knows the length of the character code (they all being of uniform length for a particular subscriber) as well as speed of transmission (which may be determined from the address of the calling subscriber and knowledge of the code speed of such calling subscriber), processor 19 may set transmit timer 24 to condition halting of the formulation of the character upon accumulation of adequate time to enable full reception of the character. Thus, if the character is ninety time units long and the start bit is received at $t_{16}$, timer 24 conditions processor 19 to halt receipt of the character at time $t_{106}$, or shortly thereafter.

Upon full construction of the character in line file memory 13 processor 19 sends the character to the called subscriber as heretofore explained. As heretofore explained, processor 19 locates the address of the called subscriber from computer 27.

As heretofore explained, each stage of multiplexer 14 is responsive to a transition of the binary value of the output from a line subscriber. When this transition reaches supergroup controller 50, the line file memory 13 is accessed at an address corresponding to the line which caused the transition. If the line is operating in an ordinary telegraph manner, the transition data, as well as the real time established by timer 24, is placed in a process queue in interrupt controller 22. When the data reaches in front of the queue, interrupt controller 22 generates an interrupt signal to processor 19. If no higher priority device is requesting service, the interrupt controller accesses the line file memory 13 at the line address of the particular line, causing the information to be gated into the first locations of the register of processor 19. After the register in processor 19 is fully loaded with data from the memory 13, processor 19 causes transfer of information through data set 16 and further causes an update of the incoming character based on the bit count, last transition time, and current time. Further, if the incoming transition is a start baud, the processor computes the time of completion and sends this time and the line number to transmit timer 24 which causes interrupt controller 22 to generate an interrupt signal when the character is completed.

Under certain circumstances it may be desirable to condition processor 19 to transmit transition information directly from multiplexer 14 to station data set 16. This may be accomplished through means of suitable apparatus in processor 19 responsive to peculiar codes associated with such commands.

One feature of the present invention resides in the fact that the processor may handle character transmissions occurring at different times as well as transmissions occurring at different speeds. For example, if it is desirous for a subscriber operating at a speed wherein each bit is 10 time units long to send a message to a subscriber operating at a reception speed of 15 time units long, upon initiating the call through computer 27 in the manner heretofore described, the computer will respond to the controlling substation with a signal indicative of the address of the called subscriber, the necessary route for communications, and the rate of data transmission, i.e., code speed. The processor may thereafter reconstruct the character code for transmission at the rate of the called subscriber. Alternatively, the calling processor may transmit at the rate dictated by the calling subscriber for reconstruction by the receiving processor.

Figure 6:
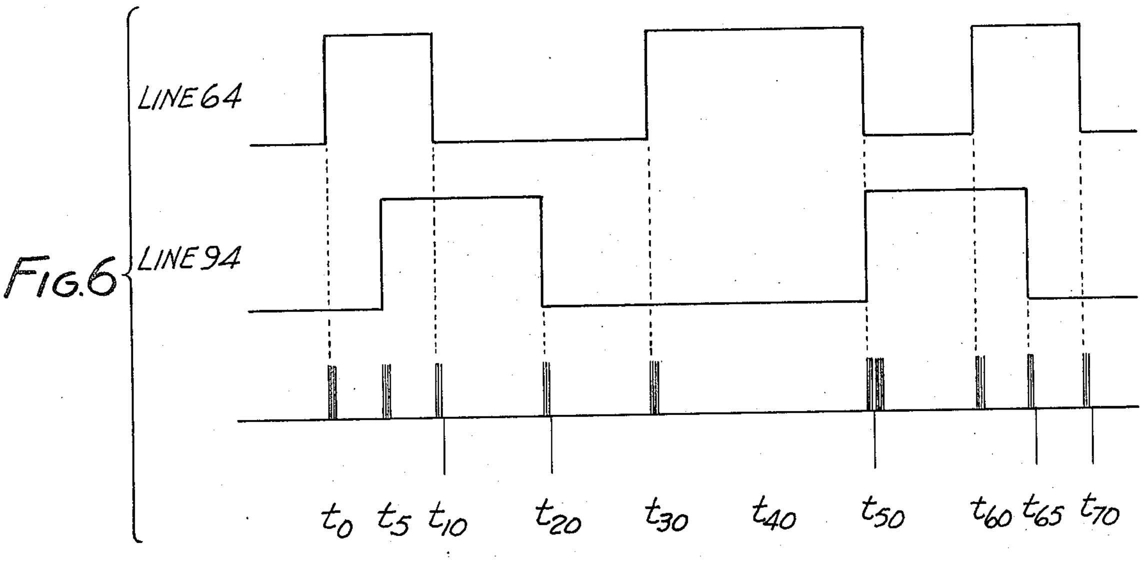

The interrupt schedule is also useful for handling staggered codes (ones commencing at various times) as well as codes operating at differing code speeds. These conditions are illustrated in FIG. 6 wherein subscriber number 64 operates at a code speed equal to 10 time units of timer 23 and commenses at $t_0$ while subscriber number 94 operates at a code speed equal to 15 time units and commenses at $t_5$, the interrupt schedule for reception of character 1001101 by line 64 and character 10010 by line 94 as follows:

| TIME | FUNCTION |
|---|---|
| $t_0$ | "mark" to line 64 |
| $t_5$ | "mark" to line 94 |
| $t_{10}$ | "space" to line 64 |
| $t_{20}$ | "space" to line 94 |
| $t_{30}$ | "mark" to line 64 |
| $t_{50}$ | "space" to line 64, "mark" to line 94 |
| $t_{60}$ | "mark" to line 64 |
| $t_{65}$ | "space" to line 94 |
| $t_{70}$ | "space" to line 64 |

The present invention thus provides a code communication system wherein codes of various speed rates and lengths may be transmitted between subscribers. Messages are routed as logic levels by the interrupt circuitry rather than as fixed length bits. If it is desired to affectuate code conversion from one form of code to another, such as from eight bit code to five bit code, and vice versa, computer 27 may seize control of the processing and affectuate code conversion internally. The present invention thus provides an effective code communications system which requires minimal operator interference.

One feature of the present invention resides in the provision of diagnostic processor 20 and its ability to test the system. Processor 20, from time to time, sends test messages through processor 19, line file memory 13 and multiplexer 14 to test the operation of the system in both the transmit and receive mode. By properly choosing codes which are unique to the test operation, testing of the system may be effectuated by processor 20 to stimulate full operation of the system. In the event of error, processor 20 may cause an error message to be sent to computer 27 for indication to appropriate personnel for remedial action.

One feature of the present invention resides in the provision of hardware self checks. For example, line file memory 13 is a fully redundant memory accessible by both diagnostic processor 20 and call processor 19. In normal operation, a read or write request from either processor results in simultaneous operation of both memories of the redundant line file memory 13. In the case of a read operation, both sets of parity are checked independently and if one of the pair shows parity error only the correct information is gated to the output and a fault indication is sent through the diagnostic processor 20. However, if both memories of the redundant line file memory 13 show parity errors, a fault reject is sent to the requesting device to allow recovery procedures. Further, the diagnostic processor is capable of commanding independent operation of the line file memories so that the operable portion of the redundant line file memory 13 is assigned to the call processor while faulted portion of the memory is exercised by the diagnostic processor to isolate the fault. Once fault location has been isolated, information may be forwarded by diagnostic processor 20 through data set 15 to computer 27 concerning the fault.

This invention is not to be limited by the embodiment shown in the drawings and described in the description, which is given by way of example and not of limitation, but only in accordance with the scope of the appended claims.

What is claimed is:

1. A communications system comprising:

a. a plurality of subscriber stations capable of transmitting and receiving coded signals comprising a stream of primary signal elements containing a plurality of sequentiallyoriented primary signal elements representative of characters, each of said primary signal elements having a logic level, each of said subscriber stations being responsive to an individual address;

b. a processor station including:

i. memory means for storing representations of said stream of primary signal elements at locations individual to each respective subscriber station;

ii. processor means associated with said memory means for transmitting to said respective subscriber station a data code representative of the logic level of the first occurring primary signal element of said stored representation of said stream of primary signal elements;

iii. interrupt means providing an indication of the time of occurrence of each subsequent primary signal element of said stored representation of said stream of primary signal elements having a logic level different from the logic value of the previous primary signal element, said processor means being responsive to said interrupt means to transmit to said respective subscriber station further data codes representative of the logic values of each of said subsequent primary signal elements of said representation; and c. converter means associated with said subscriber station and responsive to said data codes for generating a stream of secondary signal elements having a plurality of sequentially-oriented secondary signal elements each of predetermined time duration, each of said secondary signal elements having a logic value determined by said data codes.

2. A communications system according to claim 1 wherein said signal elements are bits and said logic values are binary values.

3. A communications system according to claim 2 further including multiplexer means connected between said processor station and said plurality of subscriber stations, wherein said processor means transmits to said multiplexer means an address code representative of the location of a representation stored in said memory for transmission to a respective subscriber station, said multiplexer means including address-responsive means responsive to said address code for transmitting said data codes to the respective subscriber station.

4. A communications system according to claim 3 wherein said interrupt means includes register means conditioned by said processor means for storing information concerning the time of occurrence of each subsequent bit of said stored representation having a binary value opposite from the binary value of the previous bit, clock means providing a continuous indication of time, comparator means responsive to said clock means and to the information stored in said register means for indicating the time of occurrence of said subsequent bit, and interrupt control means responsive to said comparator means for providing a control signal, said processor means being responsive to said control signal to transmit to said multiplexer means said address code representative of the location of said stored representation in said memory means and said further data code representative of the binary value of said subsequent bit of said representation.

5. A communications system according to claim 2 wherein said interrupt means includes register means conditioned by said processor means for storing information concerning the time of occurrence of each subsequent bit of said stored representation having a binary value opposite from the binary value of the previous bit, clock means providing a continuous indication of time, comparator means responsive to said clock means and to the information stored in said register means for indicating the time of occurrence of said subsequent bit, and interrupt control means responsive to said comparator means for providing a control signal, said processor means being responsive to said control signal to transmit to said multiplexer means said address code representative of the location of said stored representation in said memory means and said further data code representative of the binary value of said subsequent bit of said representation.

6. A communications system according to claim 3 wherein said multiplexer means further includes address-generating means connected to said subscriber stations and responsive to a change in binary value of signals transmitted from each subscriber station to transmit to said processor means control data consisting of a second address code representative of the individual address of the transmitting subscriber station and a control code representative of the changed binary value of signals transmitted from the respective subscriber station, said processor means being responsive to said control code to store a representation of said changed binary value in said memory means at a location representative of said second address code.

7. A communications system according to claim 6 further including timer means responsive to the time of occurrence of the first of said control data from a respective subscriber station to condition said processor means to halt storage of representations after a predetermined period of time.

8. A communications system according to claim 2 further including means controlling operation of said processor means to condition said interrupt means for establishing time indications of changes of binary values of said stored representation in accordance with a predetermined code speed of the respective subscriber station.

9. A communications system according to claim 8 wherein said last-named means is a computer capable of establishing time frames for bit lengths in accordance with predetermined code speeds of each of said subscriber stations.

10. In a communications system for transferring character representations between a processor station and a subscriber station, each of said character representations being represented by a bit stream consisting of a plurality of sequentially-oriented binary coded bits, said bits to be serially transferred at a predetermined rate, the improvement comprising: processor means in said processor station for initially transmitting data to said subscriber station representative of the binary value of the first bit of said bit stream; interrupt means in said processor station for conditioning said processor means to transmit further data to said subscriber station at times dependent upon changes in the binary value of bits of said stored bit stream, said further data being representative of the binary value of at least the next bit of said bit stream after said change; and control means associated with said subscriber station and responsive to said data for conditioning said subscriber station to receive binary signals having binary values in accordance with said data, whereby said bit stream is transferred to said subscriber station as logic levels.

11. Apparatus according to claim 10 further including memory means in said processor station for storing representation of said bit stream, said processor means being operable to determine the binary value of each bit of said bit stream from said memory means.

12. Apparatus according to claim 11 further including a plurality of said subscriber stations each having a respective address, said memory means storing the representation of each respective bit stream at locations individual to each subscriber station, multiplexer means connected between said processor station and said plurality of subscriber stations, said processor means being adapted to transmit to said multiplexer means an address code representative of the location of a representation stored in said memory for transmission to a respective subscriber station, said multiplexer means including address-responsive means responsive to said address code for transmitting said data to the respective subscriber station.

13. Apparatus according to claim 12 wherein said interrupt means includes register means conditioned by said processor means for storing information concerning the time of occurrence of each subsequent bit of said stored representation having a binary value opposite from the binary value of the previous bit, clock means providing a continuous indication of time, comparator means responsive to said clock means and to the information stored in said register means for indicating the time of occurrence of each of said subsequent bits, and interrupt control means responsive to said comparator means for providing a control signal, said processor means being responsive to said control signal to transmit to said multiplexer means said address code representative of the location of said stored representation in said memory means and said further data representative of the binary value of said subsequent bit of said representation.

14. Apparatus according to claim 11 wherein said interrupt means includes register means conditioned by said processor means for storing information concerning the time of occurrence of each subsequent bit of said stored representation having a binary value opposite from the binary value of the previous bit, clock means providing a continous indication of time, comparator means responsive to said clock means and to the information stored in said register means for indicating the time of occurrence of each of said subsequent bits, and interrupt control means responsive to said comparator means for providing a control signal, said processor means being responsive to said control signal to transmit to said multiplexer means said address code representative of the location of said stored representation in said memory means and said further data representative of the binary value of said subsequent bit of said representation.

15. Apparatus according to claim 14 wherein said processor means further conditions said register means to store information concerning the time of occurrence of the next subsequent bit of said representation of said bit stream having a binary value opposite from the binary value of said last-named subsequent bit of said representation.

16. Apparatus according to claim 12 wherein said multiplexer means further includes address-generating means connected to said subscriber stations and responsive to a change in binary value of signals transmitted from each subscriber station to transmit to said processor means control data consisting of a second address code representative of the individual address of the transmitting subscriber station and a control code representative of the changed binary value of signals transmitted from the respective subscriber station, said processor means being responsive to said control code to store a representation of said changed binary value in said memory means at a location representative of said second address code.

17. Apparatus according to claim 16 further including timer means responsive to the time of occurrence of the first of said control data from a respective subscriber station to condition said processor means to halt storage of representations after a predetermined period of time.

18. Apparatus according to claim 10 further including means controlling operation of said processor means to condition said interrupt means for establishing time indications of changes of binary values of said stored representation in accordance with a predetermined code speed of the respective subscriber station.

19. Apparatus according to claim 18 wherein said last-named means is a computer capable of establishing time frames for bit lengths in accordance with predetermined code speeds of each of said subscriber stations.

* * * * *

UNITED STATES PATENT OFFICE
CERTIFICATE OF CORRECTION

Patent No. 3,816,645 Dated June 11, 1974

Inventor(s) William G. E. Ehrich & Jackson D. Bigham, Jr.

It is certified that error appears in the above-identified patent and that said Letters Patent are hereby corrected as shown below:

Col. 2, lines 46 and 47, for "includes also" read --also includes--

Col. 5, line 4, for "subscribr" read --subscriber--

Col. 5, line 33, for "he" read --the--

Col. 12, line 64, for "said" (second occurance) read --such--

Signed and sealed this 1st day of October 1974.

(SEAL)
Attest:

McCOY M. GIBSON JR.
Attesting Officer

C. MARSHALL DANN
Commissioner of Patents